US010986136B1

(12) United States Patent
Natarajan et al.

(10) Patent No.: US 10,986,136 B1
(45) Date of Patent: Apr. 20, 2021

(54) METHODS FOR APPLICATION MANAGEMENT AND MONITORING AND DEVICES THEREOF (71) Applicant: F5 Networks, Inc., Seattle, WA (US)

(72) Inventors: Ravi Natarajan, Fremont, CA (US); Saxon Amdahl, Mountain View, CA (US)

(73) Assignee: F5 NETWORKS, INC., Seattle, WA (US)

( * ) Notice: Subject to any disclaimer, the term of this patent is extended or adjusted under 35 U.S.C. 154(b) by 772 days.

(21) Appl. No.: 14/495,997

(22) Filed: Sep. 25, 2014

Related U.S. Application Data (60) Provisional application No. 61/884,631, filed on Sep. 30, 2013.

(51) Int. Cl.
*H04L 29/06* (2006.01)
*H04L 29/08* (2006.01)
*H04L 12/26* (2006.01)

(52) U.S. Cl.
CPC ........ *H04L 63/205* (2013.01); *H04L 43/0876* (2013.01); *H04L 67/10* (2013.01)

(58) Field of Classification Search
CPC ....... H04L 63/205; H04L 67/10; H04L 41/22; H04L 47/15; H04L 47/70; H04L 47/2475; G06F 12/08; G06F 12/109; G06F 12/126
USPC ........................................................ 709/224
See application file for complete search history.

(56) References Cited

U.S. PATENT DOCUMENTS

| | | | |
|---|---|---|---|
| 5,309,355 A | 5/1994 | Lockwood | |
| 5,504,675 A | 4/1996 | Cragun et al. | |
| 5,872,915 A * | 2/1999 | Dykes | G06F 21/41 726/5 |
| 6,078,892 A | 6/2000 | Anderson et al. | |
| 6,119,097 A | 9/2000 | Ibarra | |
| 6,477,533 B2 | 11/2002 | Schiff et al. | |
| 6,499,034 B1 | 12/2002 | Macinlay | |
| 6,526,044 B1 | 2/2003 | Cookmeyer, II et al. | |
| 6,618,706 B1 | 9/2003 | Rive et al. | |

(Continued)

OTHER PUBLICATIONS

"Available Lead Products; Future Products", ABCLeads.com, Tour, last accessed Jan. 12, 2011, (www.abcleads.com/tour_lead_products.html).

(Continued)

*Primary Examiner* — James E Springer
*Assistant Examiner* — Patrick F Ngankam
(74) *Attorney, Agent, or Firm* — Troutman Pepper Hamilton Sanders LLP (Rochester)

(57) ABSTRACT

A method, non-transitory computer readable medium, and access policy manager (APM) device that provides access to applications hosted by server computing devices to client computing devices each associated with an authenticated user. Interactions of the client computing devices with the applications are monitored to obtain usage statistics. The usage statistics are correlated with identifying information for each of the authenticated users or an indication of each of the applications. Notification rule(s) or parameter(s) of a request for information are applied to the correlated usage statistics. Based on the applying, a notification is sent to one or more of the client computing devices or at least a portion of the correlated usage statistics is sent to at least one of an application administrator or an APM administrator.

20 Claims, 5 Drawing Sheets

(56) References Cited

U.S. PATENT DOCUMENTS

| | | | |
|---|---|---|---|
| 6,636,852 B2 | 10/2003 | Gozdeck et al. | |
| 6,662,164 B1 | 12/2003 | Koppelman et al. | |
| 6,711,557 B1* | 3/2004 | Palaniappan | G06F 8/60 |
| | | | 706/45 |
| 7,216,087 B2 | 5/2007 | Thompson et al. | |
| 7,236,944 B1 | 6/2007 | Schwartz et al. | |
| 7,340,410 B1 | 3/2008 | Vaillancourt et al. | |
| 7,360,697 B1 | 4/2008 | Sarkar et al. | |
| 7,373,661 B2 | 5/2008 | Smith et al. | |
| 7,454,367 B2 | 11/2008 | Yu et al. | |
| 7,483,842 B1 | 1/2009 | Fung et al. | |
| 8,027,871 B2 | 9/2011 | Williams et al. | |
| 8,135,607 B2 | 3/2012 | Williams et al. | |
| 8,260,670 B2 | 9/2012 | Walker et al. | |
| 8,271,313 B2 | 9/2012 | Williams et al. | |
| 8,326,663 B2 | 12/2012 | Christon et al. | |
| 8,326,964 B1 | 12/2012 | Chourey et al. | |
| 8,452,876 B1 | 5/2013 | Williams et al. | |
| 8,484,067 B2 | 7/2013 | Smith | |
| 2001/0037250 A1 | 11/2001 | Lefkowitz | |
| 2002/0072957 A1 | 6/2002 | Thompson et al. | |
| 2002/0077998 A1 | 6/2002 | Andrews et al. | |
| 2002/0107761 A1 | 8/2002 | Kark et al. | |
| 2002/0133368 A1 | 9/2002 | Strutt et al. | |
| 2002/0133383 A1 | 9/2002 | Chao et al. | |
| 2002/0188535 A1 | 12/2002 | Chao et al. | |
| 2003/0160815 A1 | 8/2003 | Muschetto | |
| 2003/0200282 A1* | 10/2003 | Arnold | G06F 17/3048 |
| | | | 709/219 |
| 2003/0207687 A1 | 11/2003 | Svedevail et al. | |
| 2004/0039624 A1 | 2/2004 | Ikezawa et al. | |
| 2004/0102926 A1 | 5/2004 | Adendorff et al. | |
| 2004/0143483 A1 | 7/2004 | Tivey et al. | |
| 2004/0236607 A1 | 11/2004 | Kost et al. | |
| 2005/0097000 A1 | 5/2005 | Freishtat et al. | |
| 2005/0144075 A1 | 6/2005 | Magowan et al. | |
| 2005/0165645 A1 | 7/2005 | Kirwin | |
| 2005/0246221 A1 | 11/2005 | Geritz et al. | |
| 2005/0262237 A1 | 11/2005 | Fulton et al. | |
| 2006/0010082 A1 | 1/2006 | Gee et al. | |
| 2006/0026509 A1 | 2/2006 | Porter | |
| 2006/0031178 A1 | 2/2006 | Lehrman et al. | |
| 2006/0047715 A1 | 3/2006 | Parizeau | |
| 2006/0242000 A1 | 10/2006 | Giguiere | |
| 2006/0242282 A1 | 10/2006 | Mallarkey | |
| 2007/0027746 A1 | 2/2007 | Grabowich | |
| 2007/0094086 A1 | 4/2007 | Ikezawa et al. | |
| 2007/0129993 A1 | 6/2007 | Alvin | |
| 2007/0226026 A1 | 9/2007 | Chang et al. | |
| 2007/0233561 A1 | 10/2007 | Golec | |
| 2007/0239514 A1 | 10/2007 | Lissy et al. | |
| 2007/0265928 A1 | 11/2007 | Fuchs et al. | |
| 2007/0282650 A1 | 12/2007 | Jackness et al. | |
| 2008/0004929 A9 | 1/2008 | Raffel et al. | |
| 2008/0077459 A1 | 3/2008 | Desai et al. | |
| 2008/0103946 A1 | 5/2008 | Johnson et al. | |
| 2008/0114608 A1 | 5/2008 | Bastien | |
| 2008/0126264 A1 | 5/2008 | Tellefsen et al. | |
| 2008/0162487 A1 | 7/2008 | Richter | |
| 2008/0235155 A1 | 9/2008 | Thywissen | |
| 2008/0244061 A1* | 10/2008 | Kime | H04L 41/5054 |
| | | | 709/224 |
| 2008/0250356 A1 | 10/2008 | Johns | |
| 2008/0316922 A1 | 12/2008 | Riddle et al. | |
| 2009/0030829 A1 | 1/2009 | Chatter et al. | |
| 2009/0249321 A1* | 10/2009 | Mandyam | G06F 8/65 |
| | | | 717/171 |
| 2009/0328169 A1* | 12/2009 | Hutchison | G06F 21/41 |
| | | | 726/7 |
| 2010/0280867 A1 | 11/2010 | Diaz et al. | |
| 2010/0324965 A1 | 12/2010 | Croix et al. | |
| 2011/0119276 A1 | 5/2011 | Borghetti et al. | |
| 2011/0161134 A1 | 6/2011 | Adkins et al. | |
| 2011/0178861 A1 | 7/2011 | Georgi | |
| 2011/0258016 A1 | 10/2011 | Barak et al. | |
| 2011/0307347 A1 | 12/2011 | Jentsch | |
| 2012/0110632 A1* | 5/2012 | Burghart | G06F 21/604 |
| | | | 726/1 |
| 2012/0197705 A1 | 8/2012 | Mesaros | |
| 2012/0263072 A1 | 10/2012 | Wu | |
| 2013/0159274 A1* | 6/2013 | Silberstein | H04L 67/20 |
| | | | 707/706 |
| 2013/0239176 A1* | 9/2013 | Terris | H04L 63/105 |
| | | | 726/4 |
| 2013/0326499 A1* | 12/2013 | Mowatt | G06F 8/60 |
| | | | 717/177 |
| 2014/0013432 A1 | 1/2014 | Yi | |
| 2014/0018033 A1* | 1/2014 | Luna | H04W 28/0215 |
| | | | 455/405 |
| 2014/0195620 A1* | 7/2014 | Srinivasan | H04L 51/14 |
| | | | 709/206 |
| 2014/0223423 A1* | 8/2014 | Alsina | G06F 8/65 |
| | | | 717/173 |
| 2015/0220836 A1 | 8/2015 | Wilson et al. | |

OTHER PUBLICATIONS

"Frequently Asked Questions", ABCLeads.com, Frequently Asked Questions, last accessed Jan. 12, 2011, pp. 1-3, (www.abcleads.com/frequently_asked_questions.html).

"Getting Started", ABCLeads.com, Tour, last accessed Jan. 12, 2011, (www.abcleads.com/tour_getting_started.html).

"How ABCLeads.com Connects buyers and Sellers", ABCLeads.com, Tour, last accessed Jan. 12, 2011, (www.abcleads.com/tour_buyers_sellers.html).

"How does ABCLeads.com Generate Leads?", ABCLeads.com, How does ABCLeads.com Generate Leads?, last accessed Jan. 12, 2011, pp. 1-2, (www.abcleads.com/lead_generation.html).

"How Does the "Lead Shop" Service Work?", ABCLeads.com, Lead Shop Information, last accessed Jan. 12, 2011, pp. 1-3, (www.abcleads.com/leadshopinfo.html).

"How Does the "Live Leads" Service Work?", ABCLeads.com, Live Lead Information, last accessed Jan. 12, 2011, pp. 1-4, (www.abcleads.com/live/leadinfo.html).

"Lead Types", ABCLeads.com, Lead Types, last accessed Jan. 12, 2011, (www.abcleads.com/lead_types.html).

"Retailer and Wholesaler Standard Industry Guide", Florida Department of Revenue, Aug. 1, 2010.

"Service Information", ABCLeads.com, Service Information, last accessed Jan. 12, 2011, (www.abcleads.com/service_information.html).

"We offer Two Great Options to generate Leads for you", Exclusive Life Insurance Leads, Sales for Long Term Care, Disability, Annuity, Health, last accessed Jan. 12, 2011, (www.abcleads.com/index.html).

"Welcome to the ABCLeads.com Tour!", ABCLeads.com, Tour, last accessed Jan. 12, 2011, (www.abcleads.com/tour_start.html).

"Why ABCLeads.com?", ABCLeads.com, Tour, last accessed Jan. 12, 2011, (www.abcleads.com/tour_why_leads.html).

Basuroy S., et al., "The Impact of Category Management on Retailer Prices and Performance: Theory and Evidence", Journal of Marketing, vol. 65, Oct. 2001, pp. 16-32.

F5 Networks Inc., "Partner Update", F5 Networks Inc., Newsletter, Nov. 22, 2005, pp. 1-6, Seattle WA.

F5 Networks, Inc., "BIG-IP APM", Release Notes, Oct. 21, 2014, V 11.2, pp. 1-17, F5 Networks, Inc.

F5 Networks, Inc., "BIG-IP® Access Policy Manager® Application Access Guide", Manual, Aug. 29, 2013, V 11.2, pp. 1-24, F5 Networks, Inc.

F5 Networks, Inc., "BIG-IP® Access Policy Manager® Authentication Configuration Guide", Manual, Aug. 29, 2013, V 11.2, pp. 1-68, F5 Networks, Inc.

F5 Networks, Inc., "BIG-IP® Access Policy Manager® Portal Access Guide", Manual, Aug. 29, 2013, V 11.2, pp. 1-42, F5 Networks, Inc.

(56) References Cited

OTHER PUBLICATIONS

F5 Networks, Inc., "Configuration Guide For BIG-IP® Access Policy Manager®", Manual, Oct. 31, 2013, pp. 1-456, V 11.2, F5 Networks, Inc.

F5 Networks, Inc., F5 BIG-IP TMOS: Operations Guide, Manual, Mar. 5, 2015, pp. 1-276, F5 Networks, Inc.

Gal-Or E., "Pricing Practices of Resellers in the Airline Industry: Posted Price vs. Name-Your-Own-Price Mechanisms", Jan. 2009, Graduate School of Business, University of Pittsburgh, Pittsburgh, PA.

IBM Corporation, "A Progressive Strategy for Trade Customer Price", IBM Global Business Services Executive Summary, IBM United Kingdom Limited, 2009.

Kolay S., et al., "All-units Discounts in Retail Contracts", pp. 1-35, Aug. 2002.

Moran, Alane, "F5 Launches Powerful Incentive and Rewards Program for TrafficShield™ and FirePass® Resellers", F5 Networks Inc., Press Release, Dec. 13, 2004, pp. 1-2, Seattle, WA.

Moran, Alane, "F5 Networks Broadens Partner Opportunities with New and Updated Channel Support", F5 Networks Inc., Press Release, Mar. 22, 2004, pp. 1-2, Seattle, WA.

Partner Update, F5 Networks Inc., Newsletter, Nov. 22, 2005, pp. 1-6, Seattle WA.

Strategic Economics, "Fremont Market Analysis and Retail Strategy", City of Fremont, vol. 49, No. 1, Sep. 2008.

F5 Networks, Inc., "BIG-IP® Access Policy Manager® Network Access Configuration Guide", Manual, Aug. 29, 2013, V 11.2, pp. 1-60, F5 Networks, Inc.

\* cited by examiner

METHODS FOR APPLICATION MANAGEMENT AND MONITORING AND DEVICES THEREOF

This application claims the benefit of U.S. Provisional Patent Application No. 61/884,631, filed on Sep. 30, 2013, which is hereby incorporated by reference in its entirety.

FIELD

This technology generally relates to methods and devices for monitoring and management of web applications.

BACKGROUND

Enterprises hosting applications on server computing devices often deploy an access policy manager (APM) device as a standalone device or as a module of a traffic management device capable of providing additional services. APM computing devices can be configured to implement security policies and provide authentication, authorization, and accounting (AAA) services to manage user access to applications such as Exchange or SharePoint and/or remote desktops or other virtual application environments, for example. Traffic management devices including APM functionality as a module can also be configured to provide services such as accelerating, optimizing, and/or load balancing network traffic exchanged between client computing devices and the server computing devices.

However, administrators of networks including APM computing devices, and administrators of applications hosted on those networks, are unable to obtain meaningful insight regarding the operation or performance of the applications. Specifically administrators are unable to receive notifications regarding degraded performance or availability or efficient usage of applications, or to query an APM computing device to retrieve statistical information regarding user interactions with applications. Administrators are therefore unable to make informed decisions regarding network configurations, often resulting in a reduced user experience. Additionally, current secure access devices lack the ability to communicate application performance information directly to users and do not otherwise leverage user identity or other user information to assist administrators in communicating such information.

SUMMARY

A method for application management and monitoring includes providing, with an access policy manager (APM) device, secure access to one or more applications hosted by one or more server computing devices to a plurality of client computing devices each associated with one of a plurality of authenticated users. Interactions of each of the client computing devices associated with each of the authenticated users with the applications are monitored with the APM computing device to obtain a plurality of usage statistics. The usage statistics can include application access information, application details, login times, access duration, bandwidth per application, deep end user behavior, client device info, and/or application protocol transaction metrics, for example. The usage statistics are correlated with the APM computing device with at least one of identifying information for each of the authenticated users or an indication of each of the applications. One or more notification rules or one or more parameters of a request for information are applied with the APM computing device to the correlated usage statistics. The request for information is received from an administrator of one or more of the applications or an administrator of the APM computing device. Based on the applying, a notification is sent with the APM computing device to one or more of the client computing devices or at least a portion of the correlated usage statistics is sent with the APM computing device to at least one of the application administrator or the APM administrator.

A non-transitory computer readable medium having stored thereon instructions for application management and monitoring which when executed by a processor, cause the processor to perform steps including providing secure access to one or more applications hosted by one or more server computing devices to a plurality of client computing devices each associated with one of a plurality of authenticated users. Interactions of each of the client computing devices associated with each of the authenticated users with the applications are monitored to obtain a plurality of usage statistics. The usage statistics are correlated with at least one of identifying information for each of the authenticated users or an indication of each of the applications. One or more notification rules or one or more parameters of a request for information are applied to the correlated usage statistics. The request for information is received from an administrator of one or more of the applications or an administrator of the APM computing device. Based on the applying, a notification is sent to one or more of the client computing devices or at least a portion of the correlated usage statistics is sent to at least one of the application administrator or the APM administrator.

An APM computing device includes a processor coupled to memory and configured to be capable of executing instructions stored in the memory including providing secure access to one or more applications hosted by one or more server computing devices to a plurality of client computing devices each associated with one of a plurality of authenticated users. Interactions of each of the client computing devices associated with each of the authenticated users with the applications are monitored to obtain a plurality of usage statistics. The usage statistics are correlated with at least one of identifying information for each of the authenticated users or an indication of each of the applications. One or more notification rules or one or more parameters of a request for information are applied to the correlated usage statistics. The request for information is received from an administrator of one or more of the applications or an administrator of the APM computing device. Based on the applying, a notification is sent to one or more of the client computing devices or at least a portion of the correlated usage statistics is sent to at least one of the application administrator or the APM administrator.

This technology provides a number of advantages including methods and devices that more effectively manage and monitor web application utilization. The web application utilization information is correlated with information regarding users of the web applications. With the correlated information, administrators can more effectively configure the web applications and/or associated networks. Additionally, the usage statistics can be leveraged to improve the experience of users of the web applications and communicate relevant information regarding the web application to the users.

DETAILED DESCRIPTION

Figure 1:
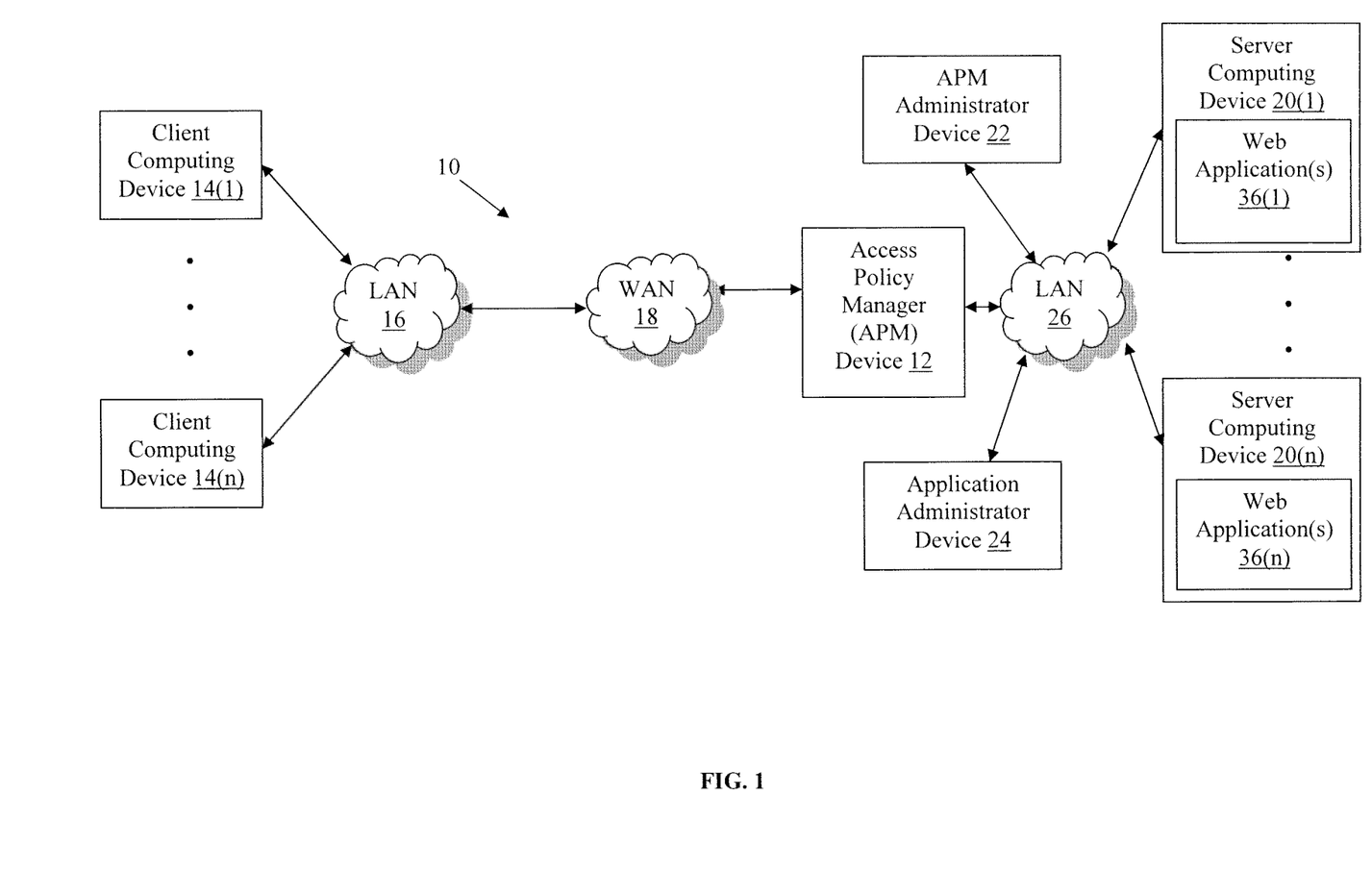
FIG. 1 is a block diagram of an network environment with an exemplary access policy manager (APM) device.

Referring to FIG. 1, a block diagram of an exemplary network environment 10 including an exemplary access policy manager (APM) device 12 is illustrated. In this example, the APM computing device 12 is coupled to a plurality of client computing devices 14(1)-14(n) through a LAN 16 and a WAN 18 and a plurality of server computing devices 20(1)-20(n), an optional APM administrator device 22, and an optional application administrator device 24 through another LAN 26, although the APM computing device 12, client computing devices 14(1)-14(n), server computing devices 20(1)-2(n), APM Administrator device 22, and/or application administrator device 24 may be coupled together via other topologies. Additionally, the network environment 10 may include other network devices such as one or more routers and/or switches, for example. This technology provides a number of advantages including methods, non-transitory computer readable medium, and devices that facilitate relatively effective monitoring and management of web applications.

Figure 2:
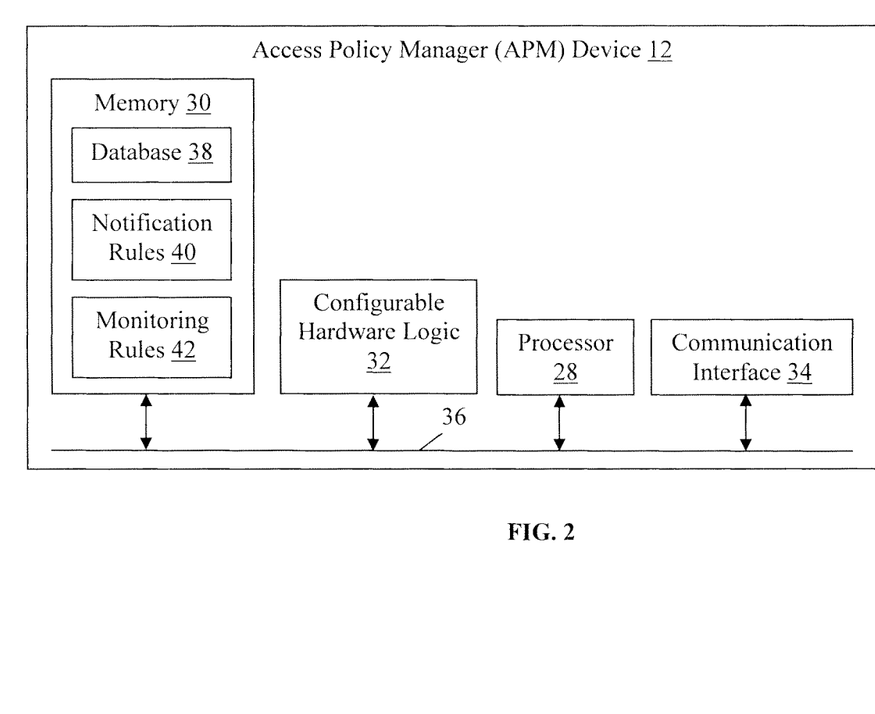
FIG. 2 is a block diagram of the exemplary APM computing device illustrated in FIG. 1.

Referring to FIGS. 1-2, the APM computing device 12 may perform any number of functions, such as providing authentication, authorization, and accounting (AAA) services, as well as optionally optimizing, securing, and/or load balancing the network traffic exchanged between the client computing devices 14(1)-14(n) and the server computing devices 20(1)-2(n), for example. The APM computing device 12 includes a processor 28, a memory 30, optional configurable hardware logic 32, and a communication interface 34 which are coupled together by a bus 36 or other communication channel, although the APM computing device 12 may include other types and numbers of elements in other configurations.

The processor 28 of the APM computing device 12 may execute one or more programmed instructions for the any number of secure access functions identified above and/or described herein for facilitating secure user access to the web applications 36(1)-36(n) hosted by the server computing devices 20(1)-20(n) and, optionally, managing network traffic and/or optimizing service of resource requests, for example. The processor 28 of the APM computing device 12 may comprise one or more central processing units and/or general purpose processors with one or more processing cores, for example.

The memory 30 of the APM computing device 12 stores these programmed instructions for one or more aspects of the present technology as described and illustrated herein, although some or all of the programmed instructions could be stored and executed elsewhere. The memory 30 of the APM computing device 12 in this example also includes a database 38 for storing usage statistics associated with user interactions with the web applications 36(1)-36(n) hosted by the server computing devices 20(1)-20(n) and configuration information.

Additionally, the memory 30 in the APM computing device 12 includes notification rules 40 and monitoring rules 42 used to generate notifications and to determine the parameters of the interactions monitored to obtain the usage statistics stored in the database 38, as described and illustrated in more detail later. A variety of different types of memory devices, such as a random access memory (RAM), read only memory (ROM), hard disk, or other computer readable medium which is read from and written to by a magnetic, optical, or other reading and writing system that is coupled to the processor 38, can be used for the memory 30 in the APM computing device 12.

The communication interface 34 of the APM computing device 12 operatively couples and communicates between the APM computing device 12, the client computing devices 14(1)-14(n), server computing devices 20(1)-20(n), APM administrator device 22, and application administrator device 24, which are all coupled together by the LANs 16 and 26 and the WAN 18, although other types and numbers of communication networks or systems with other types and numbers of connections and configurations to other devices and elements. By way of example only, the LANs 16 and 26 and the WAN 18 can use TCP/IP over Ethernet and industry-standard protocols, including NFS, CIFS, SOAP, XML, LDAP, and SNMP, although other types and numbers of communication networks, can be used.

The LANs 16 and 26 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client computing devices 14(1)-14(n) and the server computing devices 20(1)-20(n) includes a processor, a memory, and a communication interface, which are coupled together by a bus or other communication link, although other numbers and types of network devices could be used. The client computing devices 14(1)-14(n) may run interface applications, such as web browsers, that may provide an interface to make requests for and receive content associated with the web applications 36(1)-36(n) hosted by the server computing devices 20(1)-20(n) via the LANs 16 and 26 and/or the WAN 18.

The server computing devices 20(1)-20(n) may provide content in response to requests directed toward the respective web applications 36(1)-36(n) hosted by the server computing devices 20(1)-20(n) from the client computing devices 14(1)-14(n) via the LANs 16 and 26 and/or the WAN 18 according to the HTTP-based application RFC protocol or the CIFS or NFS protocol, for example. The server computing devices 20(1)-20(n) may be hardware or software or may represent a system with multiple server computing devices in a server computing device pool, which may include internal or external networks.

Further, additional server computing devices may be coupled to the LAN 26 and many different types of applications may be available on each of the server computing devices. Various network processing applications, such as CIFS applications, NFS applications, HTTP Web Server computing device applications, and/or FTP applications, may be operating on the server computing devices 20(1)-20(n) and transmitting data (e.g., files or web pages) in response to requests from the client computing devices 14(1)-14(n).

Each of the optional APM administrator device 22 and the application administrator devices 24 includes a processor, a memory, a communication interface, an input device, and a display device, which are coupled together by a bus or other communication link. A user of the APM administrator device 22 may communicate with the APM computing device 12 over the LAN 26 to configure the APM computing device 12, such as by establishing security and access policies. A user of the application administrator device 26 may communicate with the APM computing device 12 and/or server computing devices 20(1)-20(n) over the LAN 26 to configure the web application(s) 36(1)-36(n) hosted by the server computing devices 20(1)-20(n) on the APM computing device 12 or to submit notification rules, for example.

Although only one application administrator device 24 is illustrated in this example, multiple application administrator devices associated with administrators of one or more of the web applications 36(1)-36(n) can also be provided. Additionally, users of the APM administrator device 22 and/or application administrator device 24 can interface with the APM computing device 12 to establish the notification rule(s) 40 and/or the monitoring rule(s) 42, as described and illustrated in more detail later.

Although the exemplary network environment 10 with the APM computing device 12, client computing devices 14(1)-14(n), server computing devices 20(1)-20(n), APM administrator device 22, application administrator device 24, LANs 16 and 26 and the WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
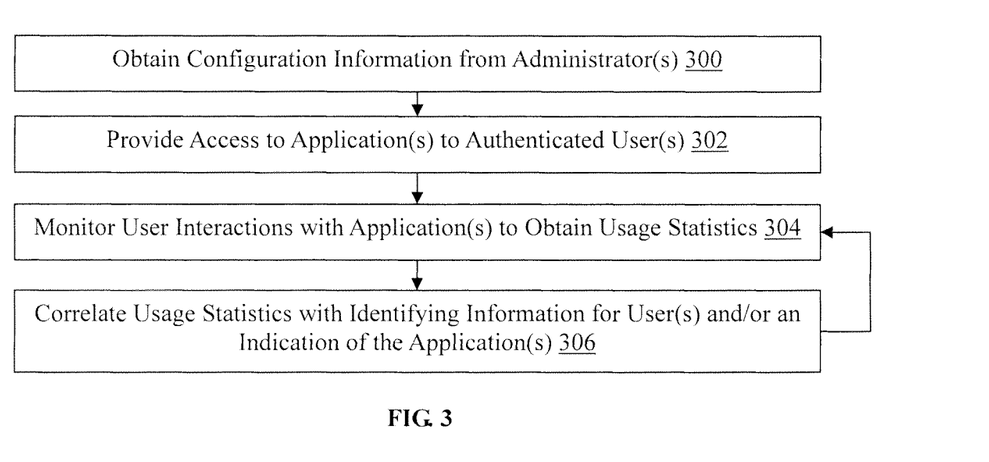
FIG. 3 is a flowchart of an exemplary method for monitoring application utilization and storing corresponding information.

An exemplary method for application management and monitoring will now be described with reference to FIGS. 1-4. Referring more specifically to FIG. 3, a method for monitoring application utilization and storing corresponding information is illustrated. In this example, in step 300, the APM computing device 12 obtains configuration information from an administrator of the APM computing device 12 and/or from administrators of the web applications 36(1)-36(n) managed by the APM computing device 12. The configuration information can include access policies that, when implemented by the APM computing device 12, facilitate providing secure access to the web applications 36(1)-36(n) hosted by the server computing devices 20(1)-20(n) to users of the client computing devices 14(1)-14(n) and blocking access by unauthorized users. The access policies can be obtained from an APM administrator through a provided interface, for example.

The configuration information can also include information regarding each of the web applications 36(1)-36(n) hosted by the server computing devices 20(1)-20(n) including application name, type, vendor, and/or associated protocol and/or a network address of a hosting one of the server computing devices 20(1)-20(n), for example, although other application information can also be obtained. The information regarding each of the web applications 36(1)-36(n) can be obtained from an application administrator through a provided interface, for example. Although initial application information can be provided during a configuration of the APM computing device 12, the application information may also be modified during operation of the APM computing device 12.

In this example, the obtained configuration information can also include the notification rules 40 that can be used to generate notifications to be sent to identified users of the client computing devices 14(1)-14(n), an APM administrator, and/or application administrator, as described and illustrated in more detail later with reference to step 408 of FIG. 4. Additionally, the configuration information can include the monitoring rules 42 including an indication of user interactions with the web applications 36(1)-36(n) or other performance characteristics monitored by the APM computing device 12, as described and illustrated in more detail later with reference to the step 400 of FIG. 4.

The notification rules 40 and/or monitoring rules 42 can be provided by the APM administrator and/or application administrator, for example, although these rules and/or any other configuration information can be obtained from other sources. The configuration information can also include contact information (e.g., e-mail addresses) for the APM administrator and the application administrator, for example. The configuration information can be stored in the memory 30 of the APM computing device 12, for example, although some or all of the configuration information can be stored elsewhere. Additionally, other configuration information can also be obtained by the APM computing device 12 in step 300.

In step 302, the APM computing device 12 provides access to one or more of the web applications 36(1)-36(n) hosted by the server computing devices 20(1)-20(n) to authenticated users of the client computing devices 14(1)-14(n). The APM computing device 12 can obtain and authenticate login credentials provided by users of the client computing devices 14(1)-14(n) and otherwise provide AAA services on behalf of the network. In this example, the APM computing device 12 also obtains identifying information for each of the authenticated users that are provided access to the web applications 36(1)-36(n) hosted by the server computing devices 20(1)-20(n). The identifying information for each of the users can include contact information (e.g., an e-mail address), a user name, a group name, a department, a title, one or more access rights, a location, or one or more attributes of an associated one of the client computing devices 14(1)-14(n) such as an operating system, a device type, one or more display characteristics, installed software, or a security feature (e.g., anti-virus software or firewall), for example.

At least a portion of the identifying information for a user can be obtained by the APM computing device 12 from a certificate used to establish a secure connection with one of the client computing devices 14(1)-14(n) associated with each of the users, a lightweight directory access protocol (LDAP) request to a directory service associated with the enterprise hosting the web applications 36(1)-36(n), and/or a packet or request header, for example, although the identifying information can also be obtained from other sources. Additionally, other identifying information for each of the users can also be obtained by the APM computing device 12.

In step 304, the APM computing device 12 monitors interactions of the authenticated users with the web applications 36(1)-36(n) hosted by the server computing devices 20(1)-20(n) to obtain usage statistics. Accordingly, in this example, the APM computing device 12 receives communications exchanged between the client computing devices 14(1)-14(n) and the web applications 36(1)-36(n) through secure sessions established by the APM computing device 12, such as SSL sessions for example. The communications associated with user interactions with the web applications 36(1)-36(n) allow the APM computing device 12 to obtain usage statistics for users, according to the monitoring rules 42, such as a duration of use of each of the web applications 36(1)-36(n), a frequency of accessing each of the web applications 36(1)-36(n), an access pattern, bandwidth utilization, and/or an indication of which of the web applications 36(1)-36(n) have been accessed, for example. The APM computing device 12 can also obtain usage statistics for the web applications 36(1)-36(n), based on the monitoring rules 42, such as application health or application performance, for example. Other user and application usage statistics and other methods of configuring the APM computing device 12 to obtain the usage statistics can also be used.

In step 306, the APM computing device 12 correlates the usage statistics with the identifying information for each user obtained in step 302 and/or an indication of an associated one of the web applications 36(1)-36(n). Optionally, the APM computing device 12 stores the correlated information in the database 38 in the memory 30 of the APM computing device 12. Accordingly, the database 38 in one example stores records with usage statistics correlated with an associated user and/or one or more of the web applications 36(1)-36(n) for past and current user sessions facilitated by the APM computing device 12. For example, the APM computing device 12 can store in the database 38 a user name and an indication of each of the web applications 36(1)-36(n) accessed by the user associated with the user name and a duration of use of each of the accessed web applications 36(1)-36(n).

In another example, the database 38 can store an indication of one or more of the web applications 36(1)-36(n) and a performance indicator. Other permutations can also be used for correlating and storing the usage statistics. Optionally, an expiration can be established for some or all of the stored data or the data can be stored indefinitely based on desired memory utilization. Subsequent to correlating and optionally storing the usage statistics, the APM computing device 12 proceeds back to the step 304 and continues to monitor user interactions. In this example, steps 304 and 306 can effectively occur continuously and in parallel for different user sessions.

Figure 4:
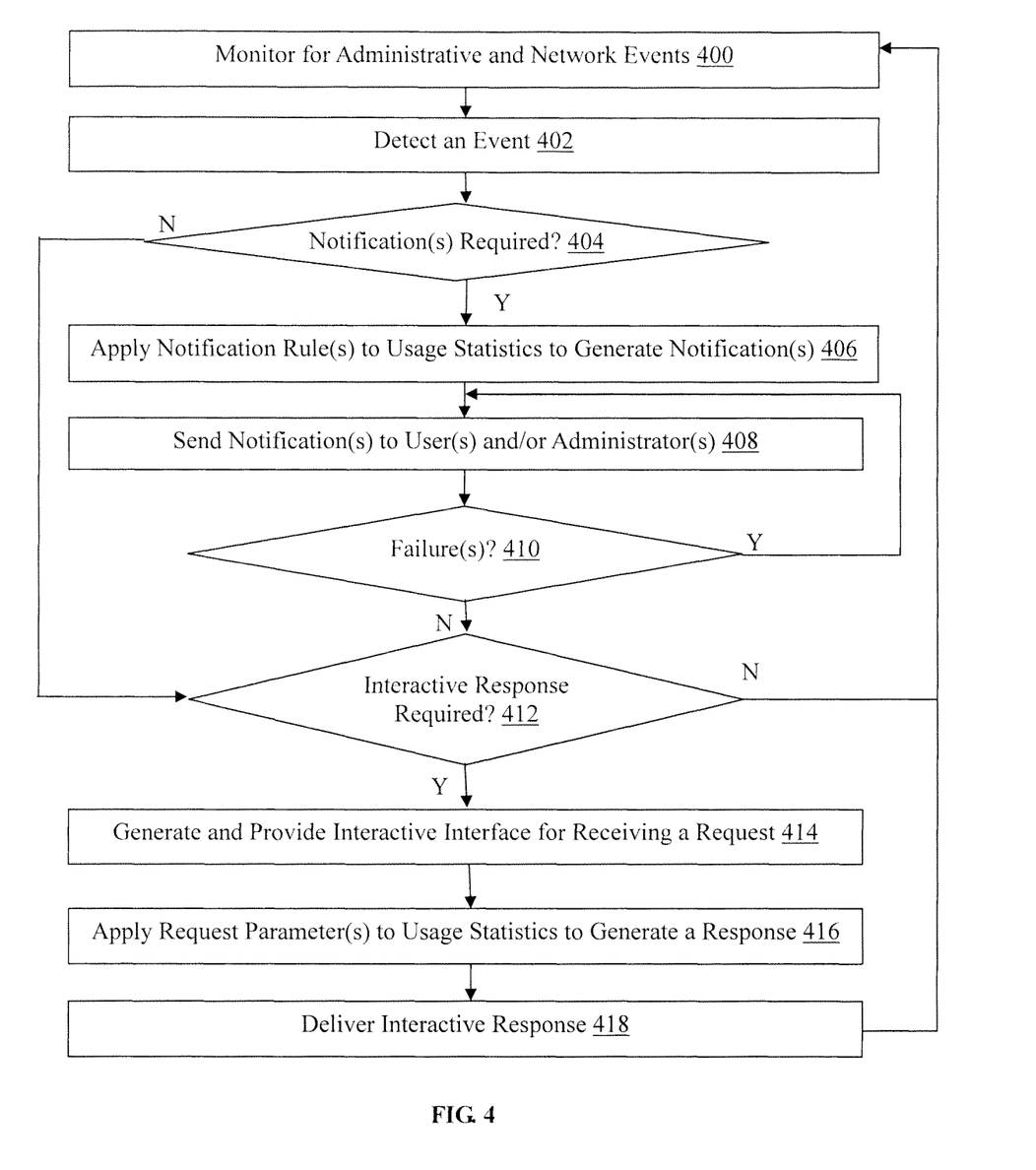
FIG. 4 is a flowchart of an exemplary method for generating and sending notifications based on detected events.

Referring more specifically to FIG. 4, a method for generating and sending notifications based on detected events is illustrated. In step 400 in this example, the APM computing device 12 monitors for administrative and network events according to the monitoring rules 42 obtained in step 300. The administrative and network events can include provisioning of a new one of the web applications 36(1)-36(n), updating one of the web applications 36(1)-36(n), and/or identifying an upcoming maintenance for one of the web applications 36(1)-36(n), as well as administrative actions such as generating reports, running queries, and determining parameters for other commands, for example.

In step 402, the APM computing device 12 detects one of the events monitored in step 400. In one example, the APM computing device 12 periodically polls each of the server computing devices 20(1)-20(n) to determine whether a new one of the web applications 36(1)-36(n) has come online or a current one of the web applications 36(1)-36(n) has been updated. In another example, the APM computing device 12 can monitor its own configuration, and/or the configuration of one or more of the web applications 36(1)-36(n) monitored and managed by the APM computing device 12, to determine whether an administrator has indicated a new one of the web applications 36(1)-36(n) is now available, one of the web applications 36(1)-36(n) has been updated, or maintenance for one of the web applications 36(1)-36(n) is scheduled to occur at a future time. Other methods of monitoring the web applications 36(1)-36(n) hosted by the server computing devices 20(1)-20(n) can also be used and other administrative and/or network events can also be detected by the APM computing device 12.

In step 404, the APM computing device 12 determines whether notification(s) are required in response to the detected event. The APM computing device 12 can utilize configuration information, for example, to determine whether the detected event requires a notification based on information associated with the event. Other methods of determining whether a notification is required in response to a detected event can also be used. If the APM computing device 12 determines that a notification is required, then the Yes branch is taken to step 406.

In step 406, the APM computing device 12 applies one or more of the notification rules 40 obtained in step 300 to the usage statistics obtained in step 304, as correlated in step 306 and optionally stored, to generate the required notification(s). Some or all of the notification rules 40 can also be obtained by the APM computing device 12 from other sources. Additionally, the notification(s) in this example can have an e-mail, SNMP, and/or SMS format or can be any other type of non-interactive communications in any other type of format. In one example, one of the notification rules 40 can result in generating a notification for all of the users that have used one of the web applications 36(1)-36(n) within a specific period of time, whenever an update is identified for the one of the web applications 36(1)-36(n) during the monitoring in step 400. In this example, the notification rules 40 can be obtained by the APM computing device 12 from an application administrator.

In order to identify the users, the APM computing device 12 can query the database 38 storing the usage statistics to determine, such as based on the indication of the web applications 36(1)-36(n) that have been accessed, or an access pattern, obtained for each of the users in step 304, which of the users have used the one of the web applications 36(1)-36(n) within the time period specified in the notification rule. Other notification rules configured to identify users to notify regarding new ones of the web applications 36(1)-36(n), new versions of the web applications 36(1)-36(n), and/or maintenance for one or more of the web applications 36(1)-36(n), for example, can also be used. Specifically with respect to application maintenance, one of the notification rules 40 can require generating a notification for users of the client computing devices 14(1)-14(n) likely to use one of the web applications 36(1)-36(n) during a scheduled maintenance period based on historical access patterns associated with each of the users, as obtained in step 304 and stored in the database 38, for example.

In another example, one of the notification rules 40 can result in generating a notification for users that have not used one or more of the web applications 36(1)-36(n) for a specified period of time. In this example, the APM computing device 12 can query the database 38 to retrieve application utilization and/or access pattern usage statistics for each of the users. Additionally, the APM computing device 12 can query the enterprise's directory service (not shown) to obtain information about all users including those users not connected. The APM computing device 12 can then analyze the retrieved information to identify inactive users with respect to one or more of the web applications 36(1)-36(n). The one of the notification rules 40 in this example can be obtained by the APM computing device 12 from an application administrator, for example, and can be used to remind users regarding the availability of one or more of the applications 36(1)-36(n). Alternatively, the one of the notification rules 40 in this example can be configured to identify inactive users with respect to one or more of the applications 36(1)-36(n) and generate a notification alerting an application administrator to facilitate a determination as to whether to continue to deploy the application to the profiles for the inactive users, for example.

In yet another example, one of the notification rules 40 can result in generating a notification when a bandwidth threshold has been exceeded for users associated with a specified department or location, which may indicate an attack, excessive use by one or more users, or a failure of the network to provide adequate service/bandwidth, for example. In this example, the APM computing device 12 can retrieve historical or current bandwidth utilization for all users having identifying information indicating the department or location, for example, specified in the one of the notification rules 40. The bandwidth utilization can then be compared to the bandwidth threshold specified in the one of the notification rules 40 to determine whether the threshold has been exceeded. Accordingly, the one of the notification rules 40 in this example can be obtained from the APM administrator and can result in generating a notification to alert the APM administrator of the excessive bandwidth utilization In yet another example, one of the notification rules 40 can result in generating a notification when a performance indicator of a specified one of the web applications 36(1)-36(n) has degraded by a threshold level for users associated with identifying information indicating a device of a specified type. Other of the notification rules 40 configured to generate notifications for user(s) and/or administrator(s) can also be used and other types, numbers, and permutations of parameters can be included in the notification rules 40.

In step 408, the APM computing device 12 sends the notification(s) generated in step 406 to one or more of the users or administrators. The notifications can be sent using contact information for the users included in the identifying information obtained in step 304 or contact information for the APM and/or application administrator obtained with the configuration information in step 300. Alternatively, the notification can be an electronic communication displayed through a user interface or dashboard provided by the APM computing device 12, such as upon an administrator of one of the web applications 36(1)-36(n) logging in to the APM computing device 12. Upon receiving the notifications, the APM and/or application administrator can add additional servers 20(1)-20(n) or instances of one or more of the web applications 36(1)-36(n) to the network and/or make configuration changes to improve performance of one or more of the web applications 36(1)-36(n), for example, although other actions could also be taken.

In one example, the notification(s) can include default message text established with one or more of the notification rules 40, such as to notify a user of a new one or more of the applications 36(1)-36(n), an update of one or more of the web applications 36(1)-36(n), or maintenance of one or more of the web applications 36(1)-36(n). In another example, the notification(s) can include textual information regarding the retrieved usage statistics and/or a graphical display, such as in the case of a request for a comparison, ranking, or change over time, for example. Other methods of sending notifications and/or responses and other types of notifications and/or responses can also be used by the APM computing device 12.

In step 410, the APM computing device 12 collects notification success/failure statuses in response to each of the notification(s) and determines whether any of the notification(s) were not successfully received by intended recipients. If the APM computing device 12 determines that one or more of the notification(s) failed, then the Yes branch is taken back to step 408 and the APM computing device 12 can attempt to resend the failed notification(s), such as based on updated configuration information from a user or an administrator, for example. Upon a second or subsequent iteration of step 410, the APM computing device 12 can optionally discontinue efforts to resend any failed notification(s). Optionally, the success and/or failure statuses collected by the APM computing device 12 can be output by the APM computing device 12 to a log instead of, or in addition to, the APM computing device 12 attempting to resend any failed notifications. Other methods for handling the collected notification statuses can also be used.

If the APM computing device 12 determines in step 410 that none of the notification(s) failed, and the No branch is taken from step 410, or if the APM computing device 12 determines that notification(s) are not required in step 404, and the No branch is taken from step 404, then the APM computing device proceeds to step 412. In step 412, the APM computing device 12 determines whether an interactive response to the event detected in step 402 is required. The APM computing device 12 can utilize configuration information, for example, to determine whether an interactive response is required based on information associated with the event. Other methods of determining whether an interactive response to a detected event is required can also be used. If the APM computing device 12 determines that an interactive response is required, then the Yes branch is taken to step 414.

In step 414, the APM computing device 12 generates an interactive interface for receiving a request for one or more metrics, such as a graphical user interface (GUI), command line interface (CLI), one or more web pages, or any other type or format of interactive interface. The generated interactive interface is provided by the APM computing device 12 to one or more of the users of the client computing devices 14(1)-14(n) and/or APM administrators or application administrators, for example. A request submitted using the provided interactive interface can include one or more parameters that are used by the APM computing device 12 to query the database 38 and retrieve usage statistics responsive to the request.

In one example, the request can be for a comparison of application performance to application utilization over time for a specified one or more of the web applications 36(1)-36(n). In another example, the request can be for utilization over a specified time period correlated with a subset of the identifying information (e.g., organized by department or location) for a specified one or more of the web applications 36(1)-36(n). In some examples, results of one or more of the notification rules 40 can cause an APM administrator or application administrator to submit a request in order to determine a resolution to a problem. In yet other examples, the request can be for a comparison of performance or utilization of one or more of the web applications 36(1)-36(n) prior and/or subsequent to a configuration change, for example. Additionally, the request can be for a ranking or other comparison of usage statistics, such as the top ten applications utilized by users of the client computing devices 14(1)-14(n), for example. Other types and number of requests in other formats can be received by the APM computing device 12.

In step 416, the APM computing device 12 applies the parameter(s) included in the received request to the usage statistics, as obtained in step 304 and correlated and optionally stored in the database 38 in step 306, to generate a response. In step 418, the APM computing device 12 delivers the generated response to one or more users of one or more of the client computing devices 14(1)-14(n) and/or an APM administrator or application administrator in response to the request.

In one example, one of the notification rules 40 can result in an alert being sent to an APM administrator or application administrator whenever the performance of one or more of the web applications 36(1)-36(n) degrades below a threshold, such as when the application experiences a failure to obtain bandwidth necessary to service one or more user interactions. In addition to receiving the notification (sent by the APM computing device 12, as described and illustrated in more detail earlier with reference to step 408), the APM administrator or application administrator may submit a request to the APM computing device 12, using the interactive interface, for bandwidth utilization for a plurality of the web applications 36(1)-36(n) in a same quality of service (QOS) system hierarchy as the one of the web application 36(1)-36(n), for example. Additionally, the request obtained by the APM computing device 12 may indicate that the bandwidth utilization for the plurality of web applications 36(1)-36(n) at a specified point in time should be organized based on user name, for example, although other manners of organizing the usage statistics can be indicated.

In this example, the APM computing device 12 applies the parameters of the request (e.g., an indication of the plurality of applications, an indication of bandwidth utilization, a point in time, and an indication of user name) to the usage statistics, correlated and stored in the database 38 as described and illustrated earlier, to generate a response including bandwidth utilization for each of the web applications 36(1)-36(n) organized by user name. With the contents of the response delivered in step 418, an APM administrator or application administrator can identify one or more users that were using a significant amount of bandwidth of one or more of the web applications 36(1)-36(n) resulting in the failure of one or more of the web applications 36(1)-36(n) to obtain bandwidth sufficient to service user interaction(s). Other types of requests and responses and other methods of generating a response to a received request can also be used.

Upon delivering the response in step 418, or if the APM computing device 12 determines that an interactive response is not required in step 412 and the No branch is taken, or at any other time, the APM computing device 12 proceeds back to step 400 and continues monitoring for administrative and network events. Additionally, one or more of steps 404-418 can be performed in parallel for various events detected in step 402.

Figure 5:
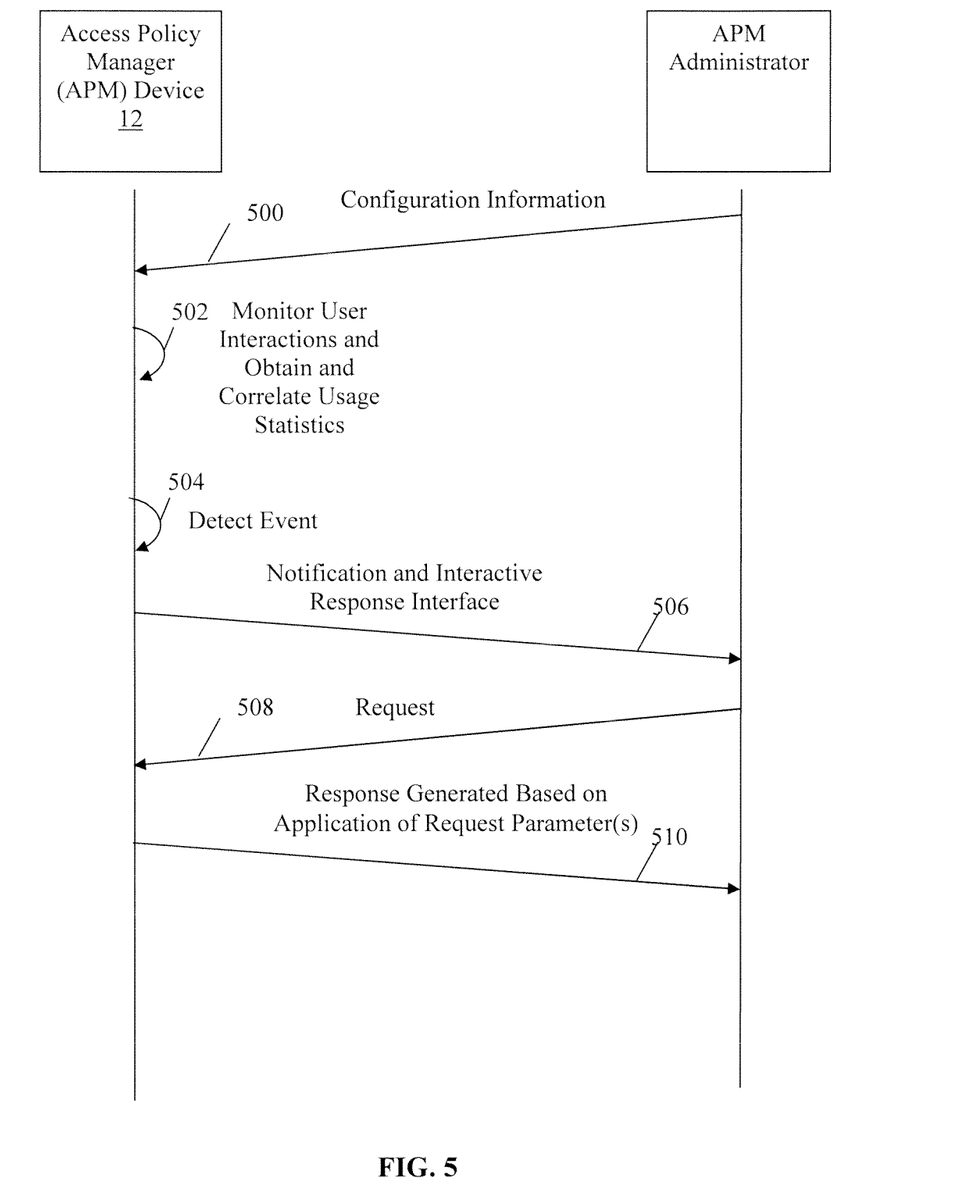
FIG. 5 is a timing diagram of an exemplary method for web application management and monitoring.

Referring to FIG. 5, a timing diagram of an exemplary method for web application management and monitoring is illustrated. In step 500 in this example, the APM administrator sends configurations information to the APM computing device 12, although in other examples the application administrator could send the configuration information to the APM computing device 12. As described and illustrated earlier with reference to step 300 of FIG. 3, the configuration information can include notification rule(s) 40 and monitoring rules 42, among other information.

In step 502, the APM computing device 12 monitors interactions by authenticated users of client computing devices 14(1)-14(n) with web applications 36(1)-36(n), obtains usage statistics regarding the interactions, and correlates the usage statistics with identifying information for the users, as described and illustrated in more detail earlier with reference to steps 302-306 of FIG. 3, for example.

In step 504, the APM computing device 12 monitors network and/or administrative events and detects one of the events for which one or more of the notification rules 40 is implicated and an interactive response is required, although other of the events may not require a notification and/or interactive response. In this example, the event can be a bandwidth threshold being exceeded for a subset of users of one of the web applications 36(1)-36(n) sharing a geographic location, although other types and numbers of events can also be detected.

Accordingly, in step 506, the APM computing device 12 sends a notification, based on an application of the one of the notification rules 40, and an interactive response interface to the APM administrator, as described and illustrated in steps 406-414 of FIG. 4, for example. The notification in this example can include an indication that a bandwidth threshold has been exceeded for a users of the one of the web applications 36(1)-36(n) that are in the geographic area, although the notification can include other information.

In step 508, an APM administrator can send a request to the APM computing device 12 using the interactive response interface sent to the APM administrator in step 506. The request in this example can be for historical bandwidth utilization for all users having identifying information indicating the geographic location, for example, although other types of requests can also be sent using the interactive response interface.

In step 510, the APM computing device 12 generates a response based on the parameters of the request and sends the response to the APM administrator in response to the received request, as described and illustrated earlier with reference to step 416 of FIG. 4, for example. The APM computing device generates the response by querying the database 38 storing the correlated usage statistics using the request parameters. Accordingly, in this example, the response includes the requested historical bandwidth utilization information. With the historical bandwidth utilization information, the APM administrator can determine whether more bandwidth should be added for the geographic location or the one of the web applications 36(1)-36(n) and/or whether the bandwidth threshold in the implicated one of the notification rules 40 should be increased, for example, although other conclusions can be made and other configuration changes could result from the information included in the response.

Accordingly, by this technology, network and/or web application administrators can more effectively manage and monitor user interactions with web applications in order to configure the networks or applications to improve the user experience. With this technology, user identifying information is obtained and leveraged to correlate usage statistics that can be provided to network and/or web application administrators upon request or automatically based on the application of preconfigured notification rules. With the notification rules, administrators can also more effectively and automatically communicate information regarding web applications to users most likely to be interested in the information based on historical usage patterns.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automated monitoring and management of enterprise networks implemented by a network traffic management system comprising one or more access management devices, administrator devices, server devices, or client devices, the method comprising:
   providing secure access to web applications for clients associated with authenticated users and obtaining, and storing in a database, identifying information for the authenticated users;
   monitoring network traffic exchanged within sessions between the clients and the web applications to obtain statistical usage data including access patterns for the authenticated users;
   correlating the statistical usage data with the identifying information for the authenticated users and storing the correlated statistical usage data in the database;
   selecting an authenticated user from the authenticated users based on an application of a notification rule to the access patterns in the stored correlated statistical usage data in response to detecting an administrative event associated with one of the web applications, wherein the administrative event comprises scheduling maintenance for the web application;
   automatically generating and sending via a communication network a notification regarding the administrative event to the authenticated user based on contact information in the identifying information for the authenticated user;
   upon sending the notification, determining when an interactive response is required for the detected administrative event based on data associated with the detected administrative event; and
   generating and providing an interactive interface to receive a request for a metric used to retrieve the stored correlated statistical usage data when the interactive response is determined to be required for the detected administrative event, wherein the generating and providing further comprises, providing a response via the interactive interface.

2. The method as set forth in claim 1, wherein the identifying information for each of the authenticated users comprises contact information, a user name, a group name, a department, a title, an access right, a location, or an attribute of the associated one of the clients comprising an operating system, a device type, a display characteristic, installed software, or a security feature.

3. The method as set forth in claim 1, wherein the statistical usage data comprise a duration of use of the web applications, a frequency of accessing the web applications, bandwidth utilization, or an indication of which of the web applications have been accessed and, for the web applications, application health or application performance.

4. The method as set forth in claim 1, wherein the selected authenticated user have associated access patterns indicating a likelihood that the web applications will be used during a scheduled maintenance period, when the administrative event comprises updating the one of the web applications or scheduling maintenance for the one of the web applications, respectively.

5. The method as set forth in claim 1, wherein the administrative event comprises updating the one of the web applications and the selected authenticated user have associated access patterns indicating use of the web application within a prior time period.

6. A non-transitory computer readable medium having stored thereon instructions for automated monitoring and management of enterprise networks, comprising executable code, which when executed by at least one processor, causes the processor to:
   provide secure access to web applications for clients associated with authenticated users and obtain, and store in a database, identifying information for the authenticated users;
   monitor network traffic exchanged within sessions between ach of the clients and the web applications to obtain statistical usage data including access patterns for the authenticated users;
   correlate the statistical usage data with the identifying information for the authenticated users and storing the correlated statistical usage data in the database;
   select an authenticated user from the authenticated users based on an application of a notification rule to the access patterns in the stored correlated statistical usage data in response to detecting an administrative event associated with one of the web applications, wherein the administrative event comprises scheduling maintenance for the web application;
   automatically generate and send via a communication network a notification regarding the administrative event to the authenticated user based on contact information in the identifying information for the authenticated user;
   upon sending the notification, determine when an interactive response is required for the detected administrative event based on data associated with the detected administrative event; and
   generate and provide an interactive interface to receive a request for a metric used to retrieve the stored correlated statistical usage data when the interactive response is determined to be required for the detected administrative event, wherein the generating and providing further comprises, providing a response via the interactive interface.

7. The medium as set forth in claim 6, wherein the identifying information for each of the authenticated users comprises contact information, a user name, a group name, a department, a title, an access right, a location, or an attribute of the associated one of the clients comprising an operating system, a device type, a display characteristic, installed software, or a security feature.

8. The medium as set forth in claim 6, wherein the statistical usage data comprise a duration of use of the web applications, a frequency of accessing the web applications, bandwidth utilization, or an indication of which of the web applications have been accessed and, for the web applications, application health or application performance.

9. The medium as set forth in claim 6, wherein the selected authenticated user have associated access patterns indicating a likelihood that the web applications will be used during a scheduled maintenance period, when the administrative event comprises updating the one of the web applications or scheduling maintenance for the one of the web applications, respectively.

10. The medium as set forth in claim 6, wherein the administrative event comprises updating the one of the web applications and the selected authenticated user have associated access patterns indicating use of the web application within a prior time period.

11. An access management device comprising memory comprising programmed instructions stored thereon and at least one processor configured to be capable of executing the stored programmed instructions to:
provide secure access to web applications for clients associated with authenticated users and obtain, and store in a database, identifying information for the authenticated users;
monitor network traffic exchanged within sessions between each of the clients and the web applications to obtain statistical usage data including access patterns for the authenticated users;
correlate the statistical usage data with the identifying information for the authenticated users and storing the correlated statistical usage data in the database;
select an authenticated user from the authenticated users based on an application of a notification rule to the access patterns in the stored correlated statistical usage data in response to detecting an administrative event associated with one of the web applications, wherein the administrative event comprises scheduling maintenance for the web application;
automatically generate and send via a communication network a notification regarding the administrative event to the authenticated user based on contact information in the identifying information for the authenticated user;
upon sending the notification, determine when an interactive response is required for the detected administrative event based on data associated with the detected administrative event; and
generate and provide an interactive interface to receive a request for a metric used to retrieve the stored correlated statistical usage data when the interactive response is determined to be required for the detected administrative event, wherein the generating and providing further comprises, providing a response via the interactive interface.

12. The device as set forth in claim 11, wherein the identifying information for each of the authenticated users comprises contact information, a user name, a group name, a department, a title, an access right, a location, or an attribute of the associated one of the clients comprising an operating system, a device type, a display characteristic, installed software, or a security feature.

13. The device as set forth in claim 11, wherein the statistical usage data comprise a duration of use of the web applications, a frequency of accessing the web applications, bandwidth utilization, or an indication of which of the web applications have been accessed and, for the web applications, application health or application performance.

14. The device as set forth in claim 11, wherein the selected authenticated user have associated access patterns indicating a likelihood that the web applications will be used during a scheduled maintenance period, when the administrative event comprises updating the one of the web applications or scheduling maintenance for the one of the web applications, respectively.

15. The device as set forth in claim 11, wherein the administrative event comprises updating the one of the web applications and the selected authenticated user have associated access patterns indicating use of the web application within a prior time period.

16. A network traffic management system comprising one or more access management devices, administrator devices, server devices, or client devices with memory comprising programmed instructions stored thereon and at least one processor configured to be capable of executing the stored programmed instructions to:
provide secure access to web applications for clients associated with authenticated users and obtain, and store in a database, identifying information for the authenticated users;
monitor network traffic exchanged within sessions between ach of the clients and the web applications to obtain statistical usage data including access patterns for the authenticated users;
correlate the statistical usage data with the identifying information for the authenticated users and storing the correlated statistical usage data in the database;
select an authenticated user from the authenticated users based on an application of a notification rule to the access patterns in the stored correlated statistical usage data in response to detecting an administrative event associated with one of the web applications, wherein the administrative event comprises scheduling maintenance for the web application;
automatically generate and send via a communication network a notification regarding the administrative event to the authenticated user based on contact information in the identifying information for the authenticated user;
upon sending the notification, determine when an interactive response is required for the detected administrative event based on data associated with the detected administrative event; and
generate and provide an interactive interface to receive a request for a metric used to retrieve the stored correlated statistical usage data when the interactive response is determined to be required for the detected administrative event, wherein the generating and providing further comprises, providing a response via the interactive interface.

17. The network traffic management system of claim 16, wherein the identifying information for each of the authenticated users comprises contact information, a user name, a group name, a department, a title, an access right, a location, or an attribute of the associated one of the clients comprising an operating system, a device type, a display characteristic, installed software, or a security feature.

18. The network traffic management system of claim 16, wherein the statistical usage data comprise a duration of use of the web applications, a frequency of accessing the web applications, bandwidth utilization, or an indication of which of the web applications have been accessed and, for the web applications, application health or application performance.

19. The network traffic management system of claim 16, wherein the selected authenticated user have associated access patterns indicating a likelihood that the web applications will be used during a scheduled maintenance period, when the administrative event comprises updating the one of the web applications or scheduling maintenance for the one of the web applications, respectively.

20. The network traffic management system of claim 16, wherein the administrative event comprises updating the one of the web applications and the selected authenticated user have associated access patterns indicating use of the one of the web application within a prior time period.

* * * * *